US009652421B2

(12) United States Patent
Muraoka et al.

(10) Patent No.: US 9,652,421 B2
(45) Date of Patent: May 16, 2017

(54) COMPUTER SYSTEM AND COUPLING CONFIGURATION CONTROL METHOD

(71) Applicant: Hitachi, Ltd., Tokyo (JP)

(72) Inventors: Satoshi Muraoka, Tokyo (JP); Keisuke Hatasaki, Tokyo (JP); Mutsumi Hosoya, Tokyo (JP); Yasunori Kaneda, Tokyo (JP); Toshihiro Ishiki, Tokyo (JP)

(73) Assignee: HITACHI, LTD. (JP)

( * ) Notice: Subject to any disclaimer, the term of this patent is extended or adjusted under 35 U.S.C. 154(b) by 1 day.

(21) Appl. No.: 14/423,769

(22) PCT Filed: Apr. 25, 2014

(86) PCT No.: PCT/JP2014/061698
§ 371 (c)(1),
(2) Date: Feb. 25, 2015

(87) PCT Pub. No.: WO2015/162777
PCT Pub. Date: Oct. 29, 2015

(65) Prior Publication Data
US 2016/0188511 A1 Jun. 30, 2016

(51) Int. Cl.
*G06F 13/00* (2006.01)
*G06F 13/20* (2006.01)
(Continued)

(52) U.S. Cl.
CPC ........ *G06F 13/364* (2013.01); *G06F 13/4022* (2013.01); *G06F 13/4282* (2013.01)

(58) Field of Classification Search
CPC ............. G06F 13/4022; G06F 13/4282; G06F 2213/0026; G06F 13/385; G06F 13/4068;
(Continued)

(56) References Cited

U.S. PATENT DOCUMENTS 7,870,191 B2   1/2011   Hatasaki et al.
9,135,044 B2 * 9/2015   Maharana ........... G06F 9/45558
(Continued)

FOREIGN PATENT DOCUMENTS

JP   2011-065551 A   3/2011
JP   2012-104105 A   5/2012
(Continued)

*Primary Examiner* — Faisal M Zaman
(74) *Attorney, Agent, or Firm* — Volpe and Koenig, P.C.

(57) ABSTRACT

A computer system includes a switch having a plurality of ports, a plurality of devices coupled to the plurality of ports, and a management system coupled to at least one of the plurality of devices and the switch. The coupling between the plurality of devices and the switch is a communication interface in which the number of master devices capable of existing in the same space is defined. The management system collects device coupling data of each of the plurality of devices coupled to the switch. Each of the device coupling data includes an ID of a port to which the device is coupled and information representing an attribute indicating whether the device is a master or a slave. The management system determines a coupling configuration on the basis of the plurality of the collected device coupling data and a communication interface protocol and, configures, to the switch, coupling information that is information in accordance with the determined coupling configuration.

15 Claims, 9 Drawing Sheets

(51) Int. Cl.
*G06F 13/36* (2006.01)
*G06F 15/167* (2006.01)
*G06F 15/173* (2006.01)
*G06F 15/16* (2006.01)
*G06F 13/364* (2006.01)
*G06F 13/40* (2006.01)
*G06F 13/42* (2006.01)

(58) Field of Classification Search
CPC ..... G06F 3/067; H04L 67/1097; H04L 49/25; H04L 41/00
USPC ........ 710/110, 316, 313, 314; 370/355, 401, 370/254; 709/212, 223, 217
See application file for complete search history.

(56) References Cited

U.S. PATENT DOCUMENTS

| | | | | |
|---|---|---|---|---|
| 2003/0018927 A1* | 1/2003 | Gadir | ................ | G06F 11/2005 714/4.11 |
| 2008/0168208 A1* | 7/2008 | Gregg | ................ | G06F 9/5077 710/306 |
| 2009/0217163 A1* | 8/2009 | Jaroker | ................ | G06F 8/60 715/700 |
| 2011/0022879 A1* | 1/2011 | Chavda | ................ | G06F 11/0793 714/1 |
| 2011/0131361 A1* | 6/2011 | Itakura | ................ | G06F 11/2033 710/313 |
| 2011/0283037 A1* | 11/2011 | Koga | ................ | G06F 11/201 710/313 |
| 2012/0086968 A1 | 4/2012 | Saito | | |
| 2012/0096192 A1* | 4/2012 | Tanaka | ................ | G06F 13/385 710/20 |
| 2012/0179804 A1 | 7/2012 | Katanp et al. | | |
| 2013/0151735 A1* | 6/2013 | Kanigicherla | ................ | G06F 13/105 710/5 |
| 2013/0268695 A1 | 10/2013 | Toda et al. | | |
| 2013/0268697 A1* | 10/2013 | Lambert | ................ | G06F 13/4022 710/11 |
| 2013/0326106 A1* | 12/2013 | Ward | ................ | G06F 13/385 710/306 |
| 2014/0040527 A1* | 2/2014 | Kanigicherla | ................ | G06F 13/4022 710/316 |
| 2014/0047116 A1* | 2/2014 | Dain | ................ | G06F 9/5061 709/226 |
| 2014/0173017 A1* | 6/2014 | Takagi | ................ | H04L 67/06 709/213 |
| 2014/0173072 A1* | 6/2014 | Chandrasekhar | ................ | G06F 9/00 709/223 |
| 2014/0173149 A1* | 6/2014 | Walker | ................ | G06F 9/45533 710/263 |
| 2014/0215458 A1* | 7/2014 | Devarapalli | ................ | G06F 9/455 718/1 |
| 2014/0317206 A1* | 10/2014 | Lomelino | ................ | H04L 67/1097 709/206 |
| 2015/0234766 A1* | 8/2015 | Weber | ................ | G06F 13/4022 710/317 |
| 2015/0378604 A1* | 12/2015 | Kawakami | ................ | G06F 3/06 710/5 |

FOREIGN PATENT DOCUMENTS

| | | |
|---|---|---|
| JP | 5352132 B2 | 11/2013 |
| WO | 2012/059971 A1 | 5/2012 |
| WO | 2012/081270 A1 | 6/2012 |

* cited by examiner

FIG. 2
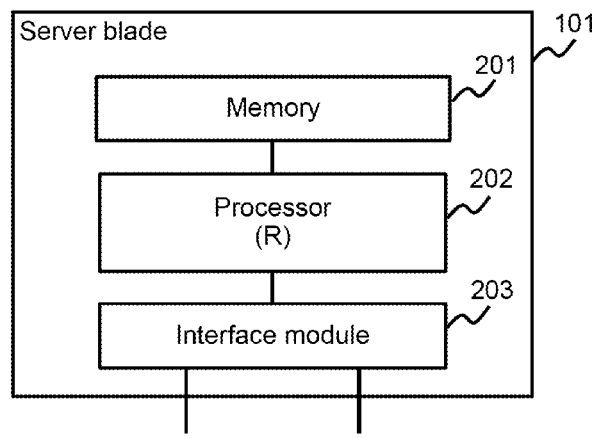
FIG. 3
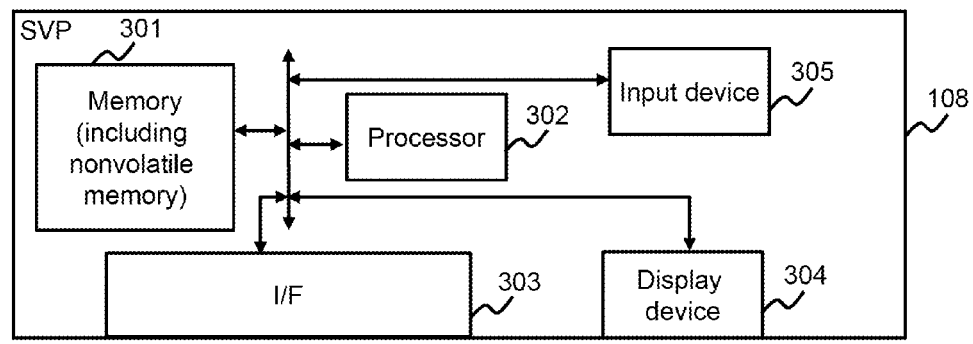
FIG. 4
| Port# | Bus# | Dev# | Name | Attribute | Width |
|---|---|---|---|---|---|
| P00 | 0 | 0 | RAID | R | x 8 |
| .... | .... | .... | .... | .... | .... |
| P10 | 0 | 1 | CPA | E | x 8 |
| .... | .... | .... | .... | .... | .... |

Comparative example

| Port# | Bus# | Dev# | Name | Attribute | Width |
|---|---|---|---|---|---|
| P00 | 0 | 0 | RAID | R | x 8 |
| .... | .... | .... | .... | .... | .... |
| P10 | - | 1 | CPA | E | x 8 |
| .... | .... | .... | .... | .... | .... |

COMPUTER SYSTEM AND COUPLING CONFIGURATION CONTROL METHOD

TECHNICAL FIELD

The present invention generally relates to control of a coupling configuration in a computer system.

BACKGROUND ART

Regarding control of a coupling configuration in a computer system, a technology disclosed in PTL 1 is known, for example. According to PTL 1, a correspondence relation between a server and an I/O (Input/Output) interface is controlled.

CITATION LIST

Patent Literature

[PTL 1] Japanese Patent No. 5352132

SUMMARY OF INVENTION

Technical Problem

There is a communication interface in which the number of master devices capable of existing in the same space is defined. PCIe (PCI-Express) is well known as such type of communication interface. In PCIe, generally, a master device is called a "root device", a slave device is called an "endpoint", and a space is called a "domain". PCIe has one root device capable of existing in the same domain, and one or more endpoints are capable of being coupled to the one root device.

In PCIe, coupling between a root device and endpoints is fixed. For example, in a computer system, a port to which a device to be a root device is coupled and a port to which a device to be an end device under control of the root device is coupled are fixed in advance. By following the fixed port, the root device and the endpoint are coupled each other.

Alternatively, in PCIe, a coupling configuration between a root device and an endpoint is manually determined. For example, a manager determines which device should be a root device and which device should be an endpoint among devices coupled to ports, and then configures, by using a maintenance terminal, a coupling configuration in accordance with the determination to the plurality of devices included in the computer system.

In this way, in PCIe, coupling between a root device and an endpoint is fixed or manually determined. Such kind of problem may be caused not only in PCIe, but also in other types of communication interfaces in which the number of master devices capable of existing in the same space is defined.

Solution to Problem

A computer system includes a switch having a plurality of ports (switch ports), a plurality of devices coupled to the plurality of switch ports, and a management system coupled to at least one of the plurality of devices and the switch. The coupling between the plurality of devices and the switch is coupling in accordance with a first communication interface. The first communication interface is a communication interface in which the number of master devices capable of existing in the same space is defined. The coupling between the at least one of the plurality of devices and the switch, and the management system is coupling in accordance with a second communication interface different from the first communication interface. The management system collects device coupling data of each of the plurality of devices coupled to the switch. Each of the device coupling data includes an ID of a switch port to which a device is coupled and information representing an attribute indicating whether the device is a master or a slave. The management system determines a coupling configuration on the basis of the plurality of collected device coupling data and configures, to the switch, the coupling information that is information in accordance with the determined coupling configuration. The coupling configuration is a configuration representing a master device, the number of which is equal to or less than a defined number, and one or more slave devices to be associated with the master device for each of one or more spaces.

Advantageous Effects of Invention

It is possible to realize a flexible and automatic coupling configuration, while following a communication interface protocol in which the number of master devices capable of existing in the same space is defined.

BRIEF DESCRIPTION OF DRAWINGS

FIG. 2 shows a configuration of a server blade.
FIG. 3 shows a configuration of an SVP.
FIG. 4 shows a configuration of a device management table.

DESCRIPTION OF EMBODIMENTS

Hereinafter, one embodiment will be described with employing PCIe (PCI-Express) as an example of communication interfaces in which the number of master devices capable of existing in the same space (e.g., an address space) is defined. PCIe has one root device capable of existing in the same address space (domain), and one or more endpoints are capable of being coupled to the one root device.

In the description below, information is occasionally explained with an expression "xxx table", but the information may be expressed by any data structure. Namely, in order to show that the information does not rely on a data structure, "xxx table" may be mentioned as "xxx information."

Further, in the description below, a number is used as an ID (identification information) of each of various targets (e.g., enclosures, or ports), however, other types of information may be used instead of or in addition to the number.

Furthermore, in the following description, when like elements are described without differentiation, reference symbols may be used, and when like elements are described with differentiation, in place of the reference symbols, serial numbers may be used.

Figure 1:
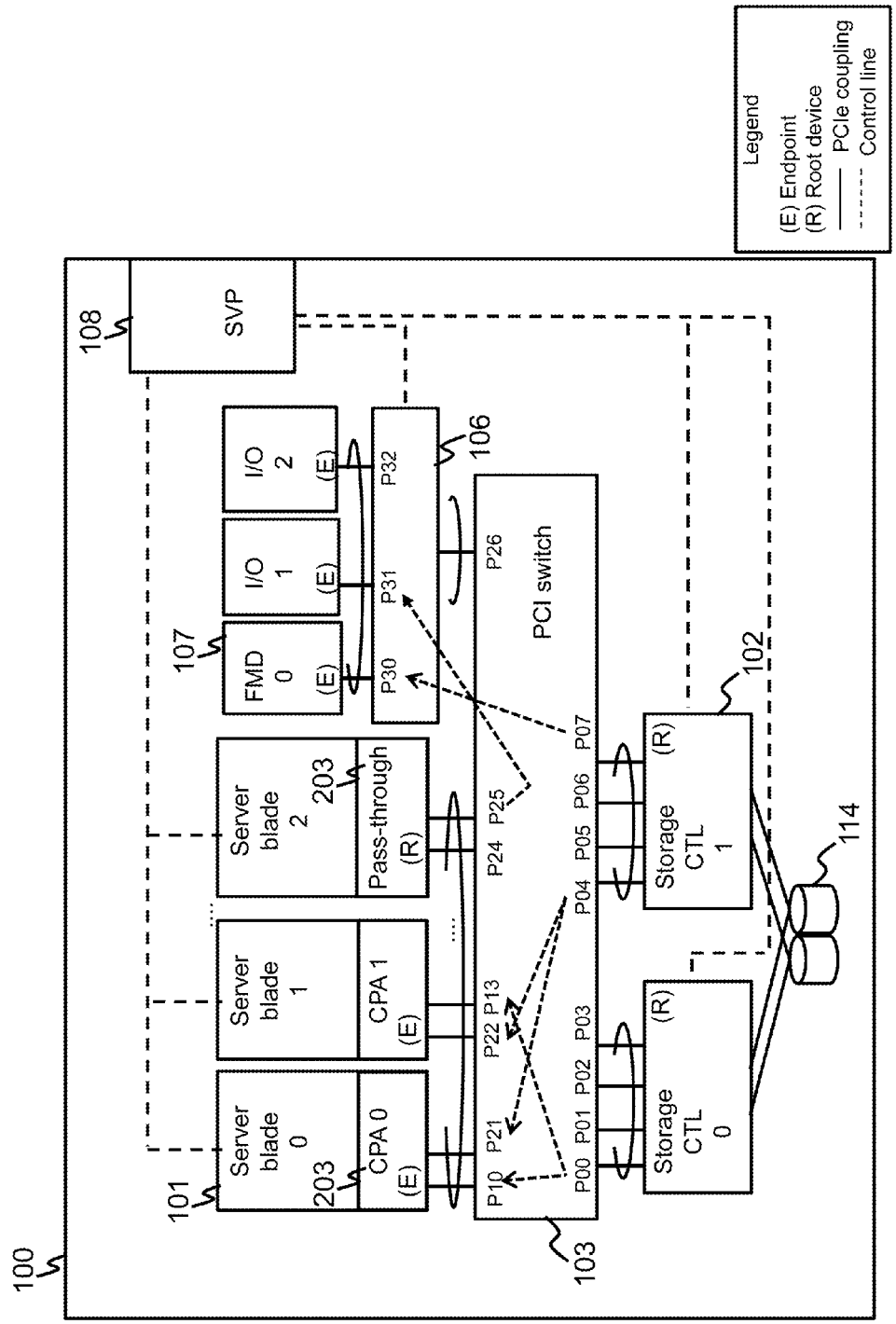
FIG. 1 shows a configuration of a computer system according to an embodiment.

FIG. 1 shows a configuration of a computer system according to an embodiment.

A computer system 100 includes a PCI switch 103, and a plurality of PCI devices coupled to the PCI switch 103. An SVP (Service Processor) 108 is coupled to at least one of the PCI switch 103 and the plurality of PCI devices. The coupling between the PCI switch 103 and the PCI devices is coupling in accordance with PCIe, and the coupling between the SVP 108 and the PCI switch 103 and between the SVP 108 and the respective PCI devices is coupling in accordance with a communication interface other than PCIe (e.g., I2C (registered trademark)).

The PCI switch 103 is an example of switches, and includes a plurality of ports (switch ports). Port numbers (P00, P01, . . . ) are assigned to the respective switch ports. As shown, when a PCI extension module 106 is coupled to the PCI switch 103, the PCI extension module 106 may be also included in the concept of the switch. The PCI extension module 106 is a module for increasing (extending) the number of the switch ports. Further, when a plurality of the PCI switches 103 exist, the plurality of PCI switches 103 are examples of the switch. Thus, the switch includes one or more switch devices (e.g., the PCI switches 103).

The PCI device is an example of devices. Examples of The PCI device include a server blade 101, a storage CTL (controller) 102, and a third device 107. In the computer system 100, not only communication within the server blade 101 and communication within the storage CTL 102 but also communication between the server blade 101 and the storage CTL 102 (communication via the PCI switch 103) is communication in accordance with PCIe. In this environment, the storage CTL 102 is a root device. The third device 107 is a device other than the server blade 101 and the storage CTL 102. Examples of the third device 107 include an I/O device (e.g., a communication interface device) and an FMD (a flash memory device), etc.

The storage CTL 102 inputs and outputs data into and from one or more PDEVs 114 in accordance with an I/O (Input/Output) command from the server blade 101. "PDEV" is an abbreviation for a nonvolatile physical storage device. A plurality of the PDEVs may form a plurality of RAID (Redundant Array of Independent (or Inexpensive) Disks) groups.

The server blade 101 sends an I/O command to the storage CTL 102. As shown in FIG. 2, the server blade 101 includes a memory 201, an interface module 203, and a processor 202 coupled to them. The processor 202 is a root device. As shown in FIG. 1, examples of the interface module 203 include a CPA, and a pass-through device. In the present embodiment, an example of a first interface module is called a "CPA". Examples of the CPA include an ASIC (Application Specific Integrated Circuit) and an endpoint. The interposition of the CPA enables communication between the root devices (i.e., the communication between the processor 202 in the server blade 101 and the storage CTL 102) under a protocol in which the number of root devices capable of existing in the single domain is one, even when both the processor 202 in the server blade 101 and the storage CTL 102 are the root devices. The communication between the processor 202 and the CPA, and the communication between the CPA and the storage CTL 102 are performed by DMA (Direct Memory Access), for example. With respect to the PCI switch 103 and the storage CTL 102, the server blade 101 including the CPA is an endpoint. On the other hand, the "pass-through device" is an example of a second interface module, and a device which is neither a root device nor an endpoint. Thus, for the PCI switch 103 and the storage CTL 102, the server blade 101 including a pass-through device is a root device. Accordingly, the server blade 101 including a pass-through device and the storage CTL 102 is not capable of being existing in the same domain. In the present embodiment, the server blade 101 including a CPA and the server blade including a pass-through device may exist in a mixed state, and even under such mixed state, it is possible to determine a coupling configuration automatically by the SVP 108. Hereinafter, the server blade including a CPA is called a "CPA server", and the server blade including a pass-through device is called a "pass-through server".

The SVP 108 is an example of a management system. The SVP 108 is a maintenance terminal of the computer system 100. The SVP 108 collects device coupling data of each of the plurality of PCI devices coupled to the PCI switch 103 via each of control lines. Each of the device coupling data includes a port number (a switch port number to which a PCI device is coupled) and an attribute (indicating whether the PCI device is a root device (R) or an endpoint (E)). The SVP 108 determines coupling configuration on the basis of the plurality of the collected device coupling data and the PCIe protocol (e.g., the number of root devices existing in the same domain is one). The coupling configuration is a configuration representing one root device and one or more endpoints to be associated with the one root device for each domain. The SVP 108 configures, to the PCI switch 103, coupling information that is information in accordance with the determined coupling configuration. For example, the coupling information is information representing correspondence between port numbers of the root devices and port numbers of the endpoints for every domain. As a result of the coupling information being configured to the PCI switch 103, logical coupling between the PCI devices is established.

In this way, it is possible to realize a flexible and automatic coupling configuration, while following the PCIe protocol. As described in the present embodiment, when a plurality of PCI devices coupled to the PCI switch 103 include a plurality of server blades and a plurality of the storage CTLs, it is possible to flexibly and automatically determine coupling configurations between the plurality of server blades 101 and the plurality of storage CTLs 102. Further, as described in the present embodiment, even when a CPA server and a pass-through server exist in a mixed state, it is possible to determine a coupling configuration automatically on the basis of the respective attributes ((R) or (E)).

In FIG. 1, it is assumed that storage CTLs 0 and 1 are redundant storage CTLs. Further, it is assumed that a dashed arrow is an example of coupling in accordance with the determined coupling configuration. The direction of the arrow represents a direction from a root device to an endpoint. In a domain in which the storage CTL 0 exists, the storage CTL 0 is coupled to a plurality of CPA servers 0 and 1. Further, each of the CPA servers 0 and 1 is coupled to each of the redundant storage CTLs 0 and 1. An FMD becomes under control of the storage CTL 102 in preference to the server blade 101.

Hereinafter, the present embodiment will be described in more detail. It should be noted that, in the description below, "determination of a coupling configuration" means to set associations between the devices (mapping), and as a result of the information in accordance with the determined coupling configuration being configured to the PCI switch and the PCI devices, logical (communicable) "coupling" between the devices is established.

FIG. 3 shows a configuration of the SVP 108.

The SVP 108 includes an input device 305, a display device 304, a memory 301, an interface device (I/F) 303, and a processor 302 coupled to them. Examples of the input device 305 include a keyboard and a pointing device. Examples of the display device 304 include a liquid crystal display device. As illustrated by touch panels, the input device 305 may be integrated with the display device 304. A control line (the control lines of the PCI switch 103 and PCI devices) in accordance with a communication interface other than PCIe (e.g., I2C (registered trademark)) is coupled to the I/F 303. The memory 301 stores a computer program executed by the processor 302 and data referred by the processor 302. The memory 301 includes a volatile memory, such as DRAM (Dynamic Random Access Memory), as well as a nonvolatile memory, such as SSD (Solid State Drive). Nonvolatile memory is an example of nonvolatile storage devices. The processor 302 controls operation of the SVP 108 by executing the computer program in the memory 301. Some processes of the SVP 108 may be performed by a hardware circuit, and the hardware circuit may be included in the processor 302. Further, the SVP 108 may not include the input device 305 and the display device 304, and a terminal (a client) may be coupled to the SVP 108 as an input/output console, such as the input device 305 and the display device 304.

FIG. 4 shows a configuration of a device management table.

A device management table 400 is stored in the memory 301 of the SVP 108. The device management table 400 is an example of the coupling configuration information stored by the SVP 108. The device management table 400 includes records for each switch port which is included in the plurality of switch ports of the PCI switch 103 and to which a PCI device is coupled. When a single PCI device is coupled to two or more switch ports, two or more device coupling data, which correspond to the two or more switch ports, respectively, are collected from the single PCI device, and the two or more device coupling data are registered in two or more records, respectively. The record is an example of information units of the coupling configuration information. The record has two or more items of the plurality of items (data elements) included in the device coupling data collected from the PCI device. Specifically, the record includes a port number 401, a bus number 402, a device number 403, a name 404, an attribute 405, and a width 406.

The port number 401 is an example of a switch port ID, and represents a switch port number to which a PCI device is coupled (a location where the PCI device is coupled). The bus number 402 represents a bus number to which the PCI device is coupled. The device number 403 represents a PCI device number. The name 404 represents a PCI device name. It is possible to specify the type of the PCI device from the name, and thus, the name is an example of information representing a device type. The attribute 405 represents whether the PCI device is a root device or an endpoint. The width 406 represents a bus width.

Figure 5:
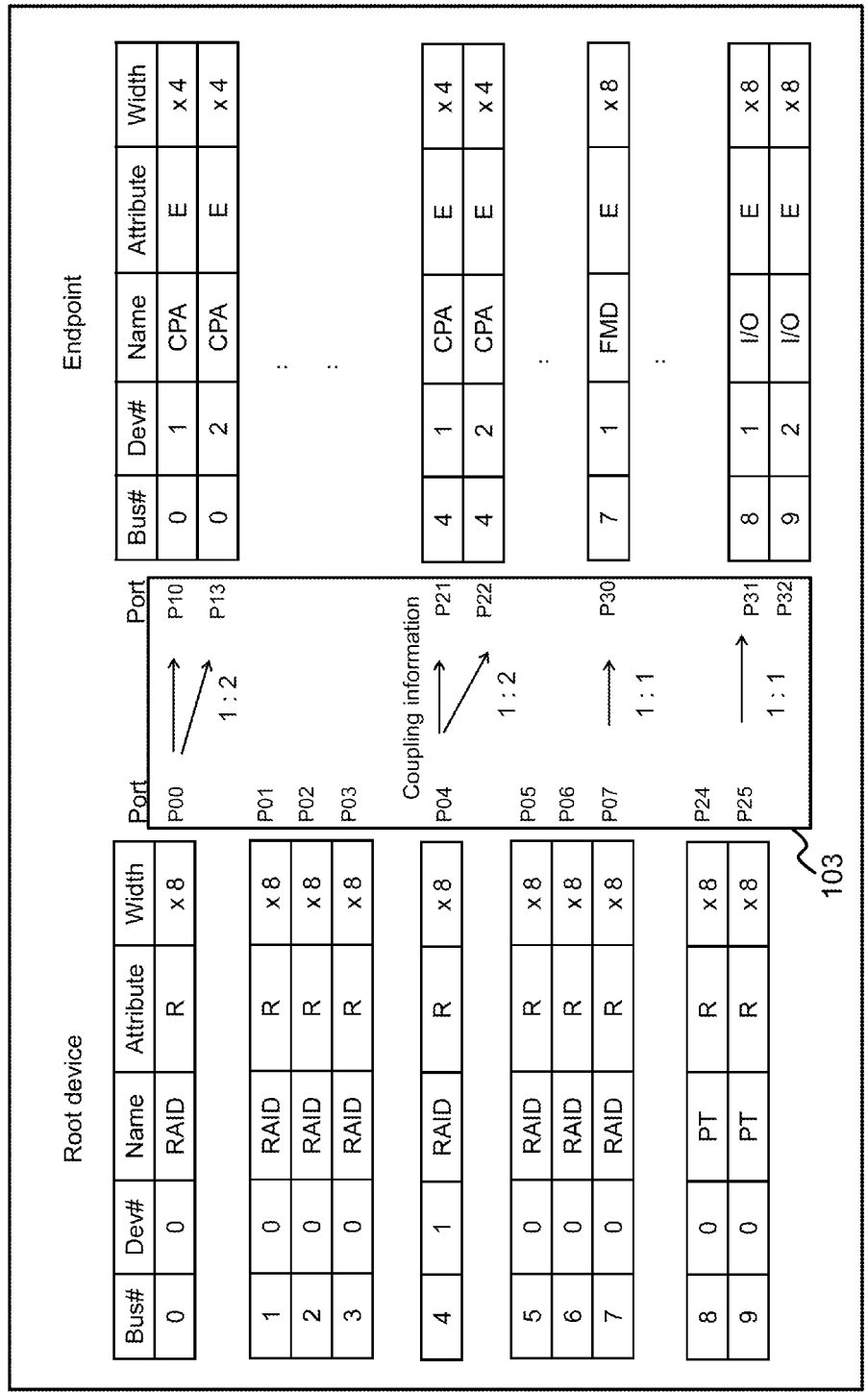
FIG. 5 shows a concept of a coupling configuration control.

FIG. 5 shows a concept of a coupling configuration control.

Regarding names of PCI devices, "RAID" represents the storage CTL 102, "CPA" represents a CPA server, "PT" represents a pass-through server, "FMD" represents an FMD, and "I/O" represents an I/O device. A single PCI device may be coupled to two or more switch ports.

The same bus number represents the same domain. Thus, the bus number is substantially a domain ID. PCI devices having the same bus number is capable of communicating with each other, and in other words, PCI devices having different bus numbers are not capable of communicating with each other. The bus number (e.g., a bus number of an endpoint) is determined by the SVP 108. The determination of a coupling configuration includes a process of the determination of a bus number (a bus represented by the bus number is a logical bus.).

The SVP 108 is capable of specifying all possible combinations (combinations of the root device and the endpoints) on the basis of the plurality of device coupling data (e.g., name and attribute, in particular) collected from the plurality of PCI devices, respectively, and the PCIe protocol. The SVP 108 narrows down all the possible combinations in accordance with a predetermined policy for configuration determination to determine a coupling configuration. According to FIG. 5, each bus number of a single storage CTL and two CPA servers is set to the same number (e.g., "4"), to accomplish a coupling configuration in which storage CTL:CPA server=1:2, for example. Further, bus numbers of a single storage CTL and respective FMDs are set to the same number (e.g., "7"), to accomplish a configuration in which the FMDs are coupled to the storage CTL.

The coupling information configured to the PCI switch 103 by the SVP 108 includes information representing coupling between the switch ports. According to the example of FIG. 5, the coupling information includes information representing that P10 and P13 are coupled to P00. As a result, the PCI switch 103 becomes to output the data, which is input from the switch port P00, from either one of the switch port P10 or P13 (in other words, the PCI switch 103 becomes not to output the data from switch ports other than the switch ports P10 and P13).

It should be noted that, after the automatic determination of the coupling configuration, the SVP 108 may display information representing the determined coupling configuration on the display device 304, to accept a manual change of the coupling configuration by a manager (e.g., a change of a bus number of an endpoint desired by the manager). The coupling configuration may be changed via a command line interface, or via a graphical user interface displaying information in accordance with FIG. 5.

Figure 6:
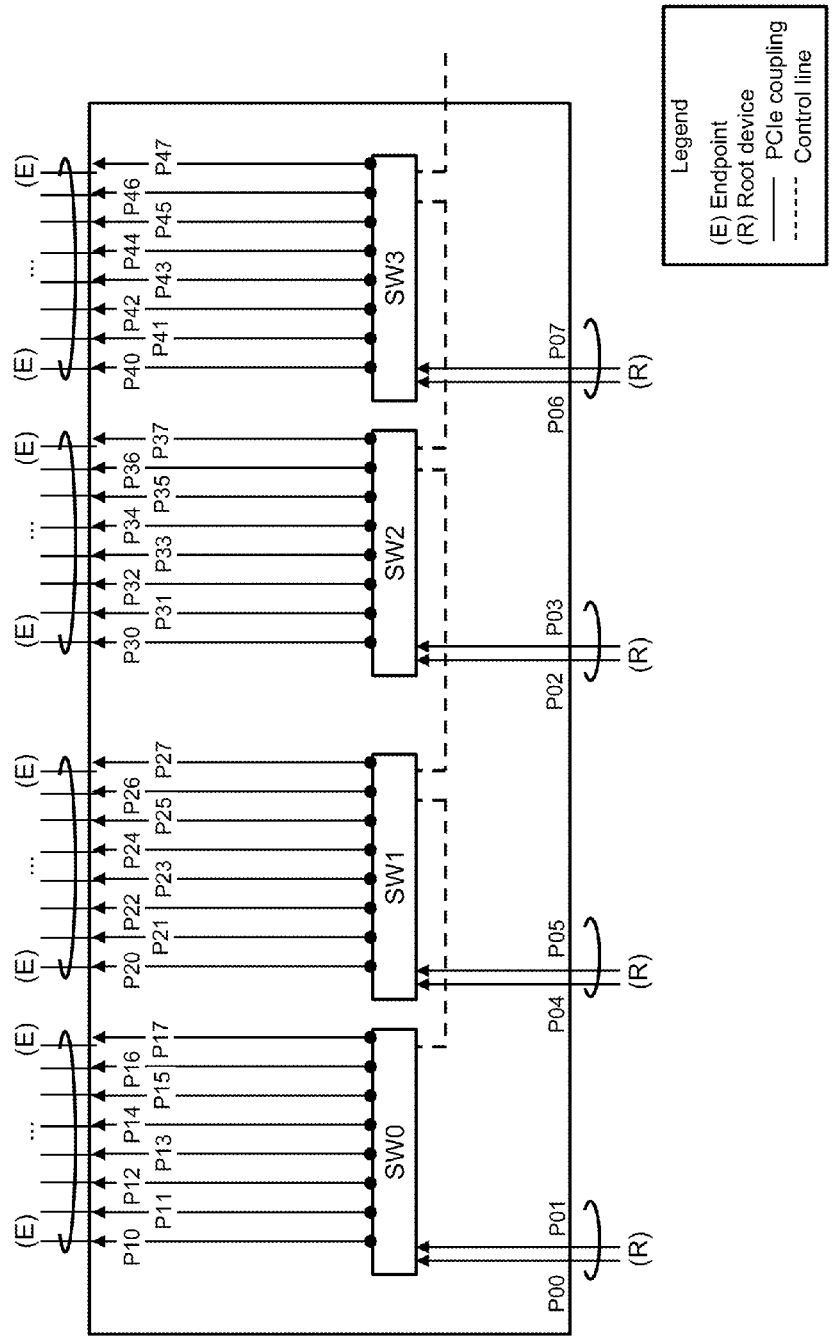
FIG. 6 shows a comparative example of a PCI switch.

In the present embodiment, it is possible to realize a flexible and automatic coupling configuration, while following the PCIe protocol. In a case of a PCI switch according to a comparative example of FIG. 6, a manager must know, in advance, configurations for all the switch ports (i.e., which of a root device or an endpoint should be coupled to each of the switch ports). In the present embodiment, it is possible to couple at least two switch ports to either of a root device or an endpoint, respectively Thus, when the devices are coupled to these switch ports, it is possible for the system side to switch the attributes of the switch ports on the basis of attribute information of the devices. Hereinafter, a switch port capable of coupling to either of the root device or the endpoint is called an "R/E port".

Figure 7:
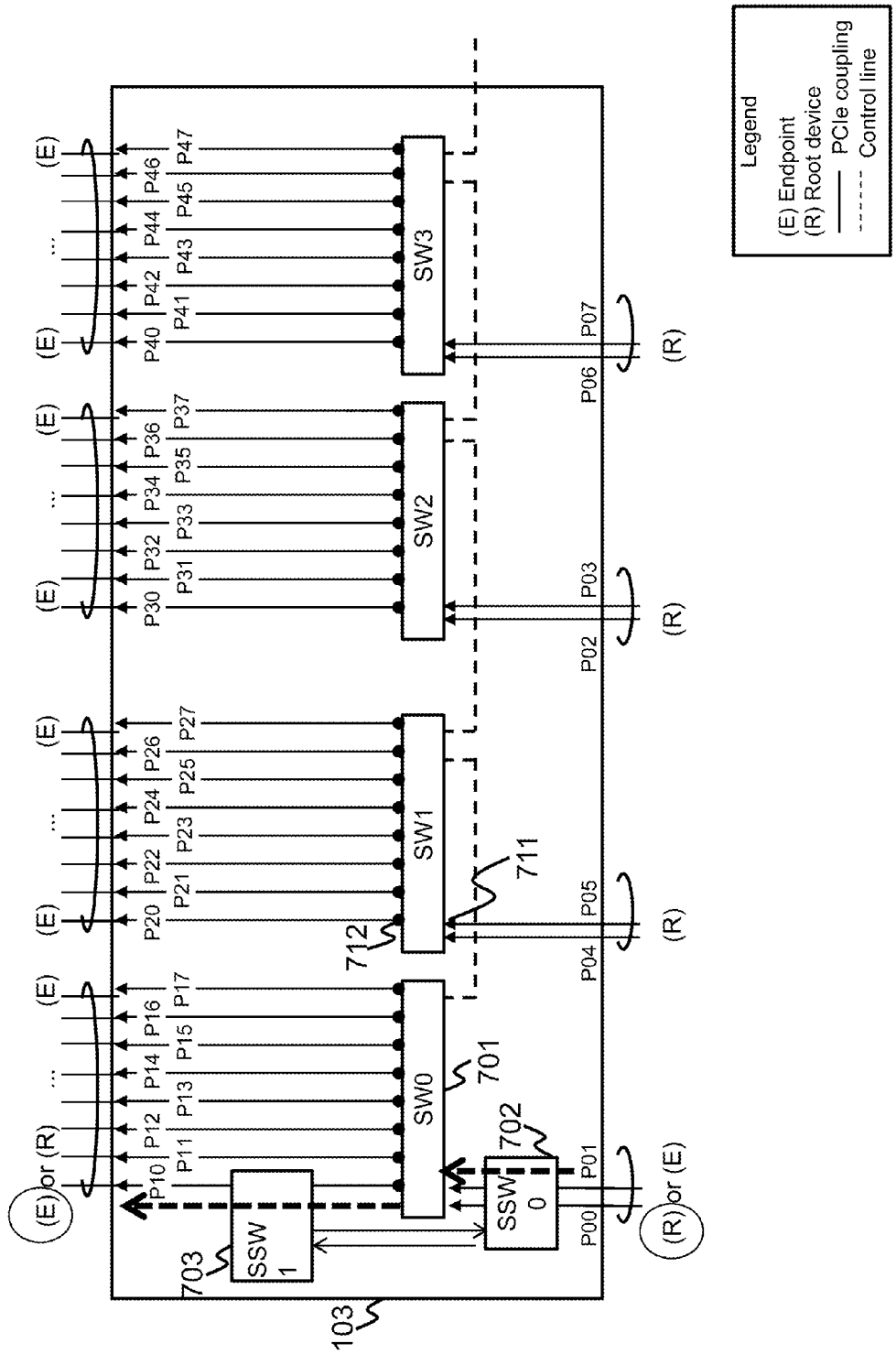
FIG. 7 shows a first example of switching in a PCI switch.

FIG. 7 shows a configuration of the PCI switch 103.

The PCI switch 103 includes a plurality of switch parts 701 (SW0 to SW3). Each of the switch parts 701 includes an input part 711 (e.g., two input ports) and a plurality of output parts 712 (e.g., eight output ports). The input part 711 and the output parts 712 are coupled to any one of the switch ports, respectively. The PCI switch 103 is configured to output data, which is input to the input part 711 of the switch part, from any one of the plurality of output parts 712 in accordance with the coupling information configured by the SVP 108. The SVP 108 is capable of recognizing the switch configuration from the data collected from the PCI switch 103, and storing switch configuration information representing the recognized switch configuration in the memory 301. The data collected from the PCI switch 103 may include a switch part ID, a switch port number coupled to the switch part, and an attribute of a switch port (indicating which of the input part or the output part the switch port is coupled to) for every switch part. The SVP 108 may determine the coupling configuration also on the basis of the switch configuration information, in addition to the device coupling data of each PCI device and the PCIe protocol. For example, the switch configuration may be a configuration representing a correspondence relation between the plurality of switch parts 701 and the numbers of the plurality of switch ports, and which of the input part or the output part each of the switch ports is a port to be coupled to.

Further, as shown in an example of FIG. 7, the plurality of switch ports included in the PCI switch 103 may include a switch port to which an endpoint should be coupled (hereinafter, "E port") and a switch port to which a root device should be coupled (hereinafter, "R port"). However, the plurality of switch ports include at least two R/E ports. According to the example of FIG. 7, the switch ports P00, P01, and P10 are R/E ports, respectively. Each of the switch ports P00 and P01 is an example of a first port, and corresponds to each of the two input parts of the switch part SW0. The switch port P10 is an example of a second port, and corresponds to one of the output parts of the switch part SW0. In the present embodiment, the R/E port is realized while maintaining a mechanism including input to the input part of the switch part SW0 and output from the output part of the switch part SW0.

Specifically, the PCI switch 103 includes a first sub-switch part 702 and a second sub-switch part 703 with respect to a set of the R/E ports (P00, P01) corresponding to the input part and the R/E port (P10) corresponding to the output part. The first sub-switch part 702 and the second sub-switch part 703 are coupled to be capable of bidirectionally communicating. The first sub-switch part 702 is interposed between the two R/E ports (P00, P10) and the two input parts of the switch part SW0. The second sub-switch part 703 is interposed between the one output part of the switch part SW0 and the R/E port (P10).

According to an example of FIG. 7, a root device is coupled to the R/E ports (P00 and P01), and an endpoint is coupled to the R/E port (P10). In this case, the coupling information configured to the PCI switch 103 is information representing a path which is R/E ports (P00 and P01)->the first sub-switch part 702->the switch part SW0->the second sub-switch part 703->the R/E port (P10). In accordance with the coupling information, the PCI switch 103 outputs data, which is input from the R/E port (P00 or P01), from the R/E port (P10) via the first sub-switch part 702, the switch part SW0, and the second sub-switch part 703.

Figure 8:
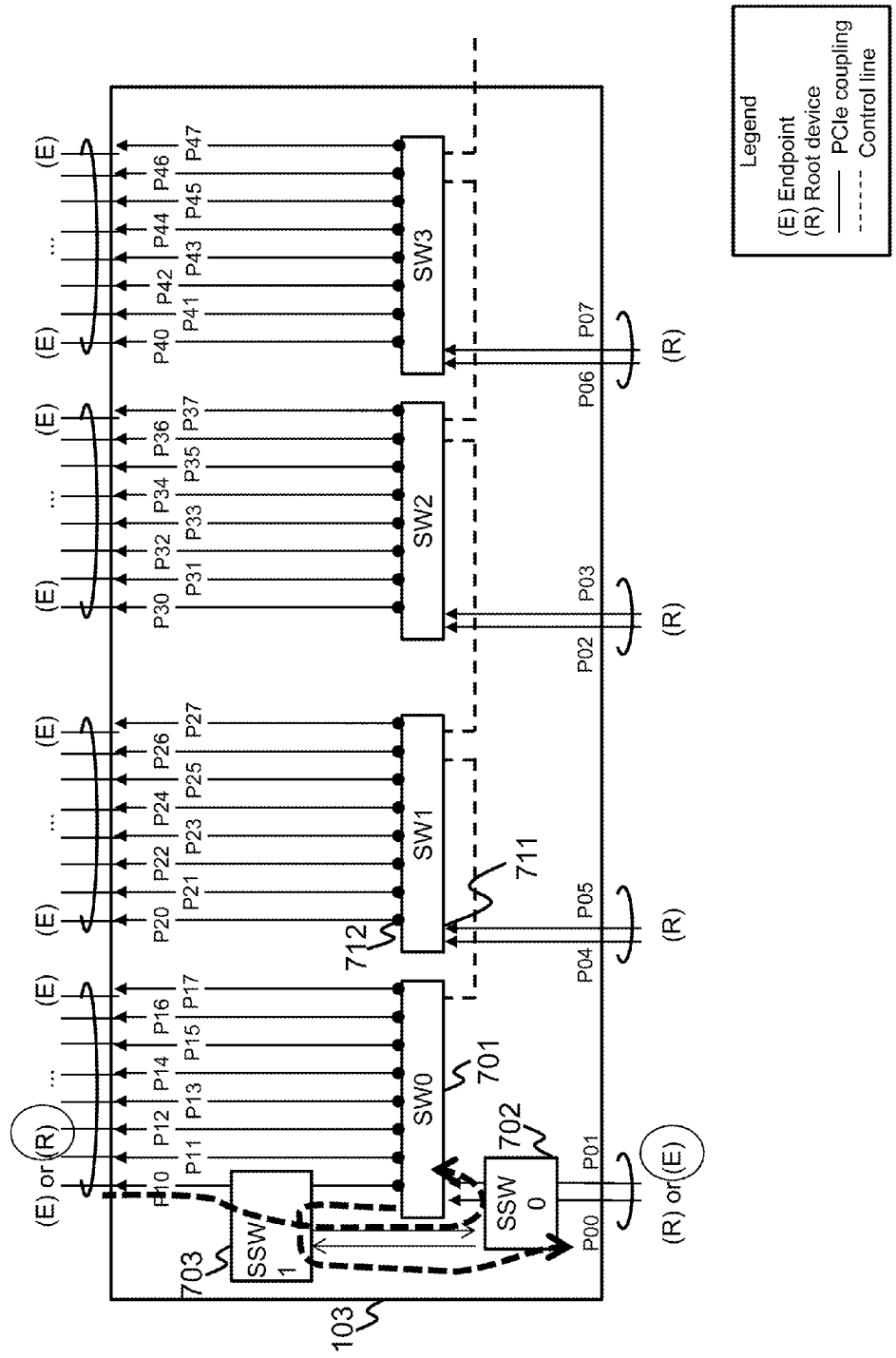
FIG. 8 shows a second example of switching in the PCI switch.

On the other hand, according to an example of FIG. 8, an endpoint is coupled to the R/E ports (P00 and P01), and a root device is coupled to the R/E port (P10). In this case, the coupling information configured to the PCI switch 103 is information representing a path which is the R/E port (P10)->the second sub-switch part 703->the first sub-switch part 702->the switch part SW0->the second sub-switch part 703->the first sub-switch part 702->the R/E port (P00 or P01). In accordance with the coupling information, the PCI switch 103, the PCI switch 103 outputs data, which is input from the R/E port (P10), from the R/E port (P00 or P01) via the second sub-switch part 703, the first sub-switch part 702 and the switch part SW0, and further via the second sub-switch part 703 and the first sub-switch part 702.

As described above, the first and second sub-switch parts 702 and 703, which are arranged for a set of a switch port corresponding to the input part and a switch port corresponding to the output part is capable of realizing the R/E port while maintaining a mechanism including input to the input part of the switch part and output from the output part of the switch part.

It should be noted that, in FIG. 7 and FIG. 8, there is the single set of the R/E port corresponding to the input part and the R/E port corresponding to the output part, and thus, the only one set of the first and second sub-switch parts 702 and 703 is shown. However, the set of the first and second sub-switch parts 702 and 703 may be arranged for each set of the R/E port corresponding to the input part and the R/E port corresponding to the output part.

Hereinafter, processes performed in the present embodiment will be described.

Figures 9, 10:
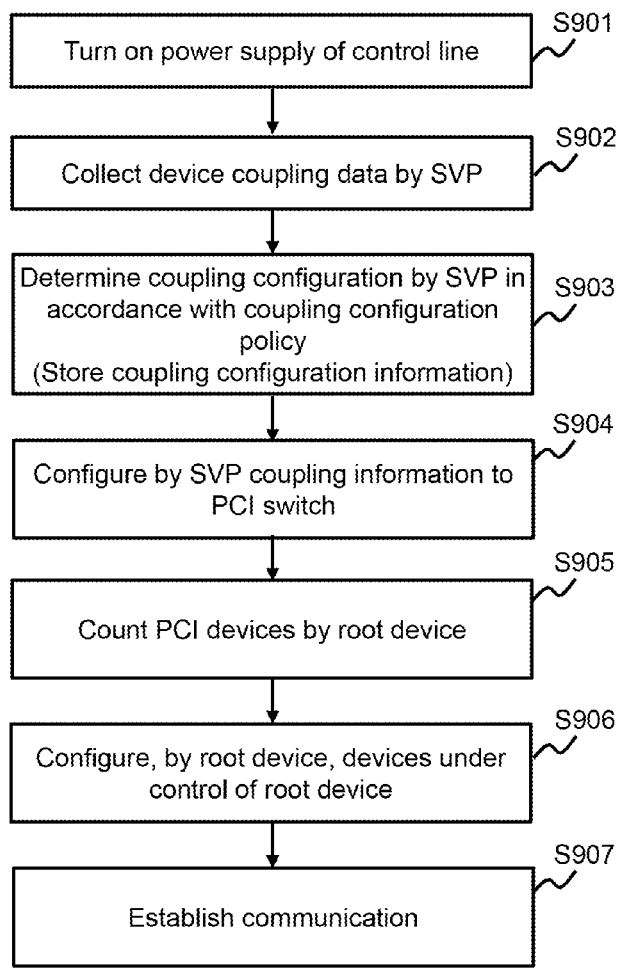
FIG. 9 shows a flow of an automatic coupling process.
FIG. 10 shows an example of a device management table in which device coupling data collected in the automatic coupling process are registered.

FIG. 9 shows a flow of an automatic coupling process.

The SVP 108 detects turning on of a power supply of a control line coupled to the SVP 108 (S901). The processor 302 of the SVP 108 collects device coupling data from the PCI device coupled to the control line via the turned on control line (S902). As shown in FIG. 10, the processor 302 registers items in the collected device coupling data with the device management table 400. It should be noted that, in the present embodiment, bus numbers are configured to device coupling data of root devices, while no bus number is configured yet to device coupling data of endpoints (see FIG. 10).

The processor 302 of the SVP 108 automatically determines a coupling configuration on the basis of the PCIe protocol (e.g., the number of root devices existing in one domain is one) and a predetermined coupling configuration policy (S903). The coupling configuration may be determined also on the basis of the above described switch configuration. To determine a coupling configuration may be to set associations between the devices, and to set associations between the devices may be to update bus numbers of endpoints to the same number as a bus number of a root device to be associated with the endpoints. The processor 302 stores the device management table 400 representing the determined coupling configuration in a nonvolatile memory in the memory 301 (otherwise, a nonvolatile storage device capable of being accessed by the SVP 108). In the present embodiment, the device management table 400 may be the device management table 400 after the bus numbers of the endpoints is updated (the device management table 400 updated by the processor 302 in accordance with the determined coupling configuration).

The processor 302 of SVP 108 configures, to the PCI switch 103, the coupling information in accordance with the coupling configuration determined in S903 (such as the information representing associations between the switch ports, as illustrated in FIG. 5) (S904). It is noted that when the attribute in the device coupling data collected in S902 is originally different from the attribute configured to the R/E port to which the device is coupled, the SSW is switched at this timing so as to conform the attribute of the device to be coupled to the attribute configured to the port. As a result, the PCI switch 103 is capable of relaying the communication between the devices in accordance with the coupling information. Further, the processor 302 may configure the updated bus number of the endpoint, to the endpoint thereof.

The processor 302 of the SVP 108 sends an activation instruction to respective root devices coupled to the PCI switch 103. In response to the activation instruction, the root device counts the PCI devices (the endpoints) capable of communicating with the root device (S905), and configures these PCI devices (endpoints) as being under control of the root device (S906). Specifically, the root device broadcasts a predetermined inquiry and counts the number of the responses for the inquiry in S905, and the root device configures, to its memory, the information in the responses (e.g., the addresses of the endpoints (the switch port numbers)) in S906, for example.

Then, the root device corresponds with the PCI devices (the endpoints) under control thereof in a predetermined manner, on the basis of the information configured in S906, and thereby, the communication is established (S907).

In the coupling configuration determination process (S903 in FIG. 9), the possible combinations of the root devices and the endpoints are narrowed down in accordance with the predetermined coupling configuration policy (e.g., a policy registered in the memory 301). The coupling configuration policy may partially be editable by a manager. In the order of priority, default coupling configuration policies are (first-order priority) determination of coupling configurations of storage CTLs and CPA servers (to secure redundancy and to maximize the number of parallel I/Os), (second-order priority) determination of coupling configurations for FMDs and storage CLTs, and (third-order priority) determination of coupling configurations of the other root devices and the other endpoints.

Hereinafter, regarding each order of priority, FIG. 1 and FIG. 5 will be referred appropriately.

At first, in accordance with the first-order priority, reliability and I/O performance of a storage CTL and a CPA server are secured. In accordance with the policy requiring to secure redundancy, the single CPA server 0 is associated with the redundant storage CTLs 0 and 1. Specifically, the bus number of the CPA server 0 for the switch port P10 is set to the same number as the bus number of the storage CTL 0 for the switch port P00. Further, the bus number of the CPA server 0 with respect to the switch port P21 is set to the same number as the bus number of the storage CTL 0 with respect to the switch port P04. Further, in accordance with the policy requiring to maximize the number of parallel I/Os, as many CPA servers as possible are associated with the plurality of ports (storage ports) included in the single storage CTL 0.

In accordance with the second-order priority, the FMDs are associated with the storage CTL preferentially. A FMD being under control of the server blade leads to trouble of updating a specification of an application program executed by the server blade in order to use the FMD as a buffer, while in a case where the FMD is preferentially set to be under control of the storage CTL, such trouble of the application program executed by the server blade does not occur. It should be noted that a manager may change the second-order priority to "to couple FMD to bus through server", or the manager may manually change coupling destinations of FMDs to the pass-through server in place of the storage CTL, after automatic determination of coupling configuration. Further, regarding the second-order priority, each of the redundant storage CTLs 0 and 1 may be associated with the FMD. In addition, each of the redundant storage CTLs 0 and 1 may also be associated with endpoints other than the FMDs and the CPA servers.

In accordance with the third-order priority, the other root devices (e.g., pass-through servers) are associated with the other endpoints (e.g., I/O devices). It should be noted that at least one of a type and the number of endpoints (e.g., I/O devices) that should be associated with the pass-through server may be defined in the coupling configuration policy.

Figure 11:
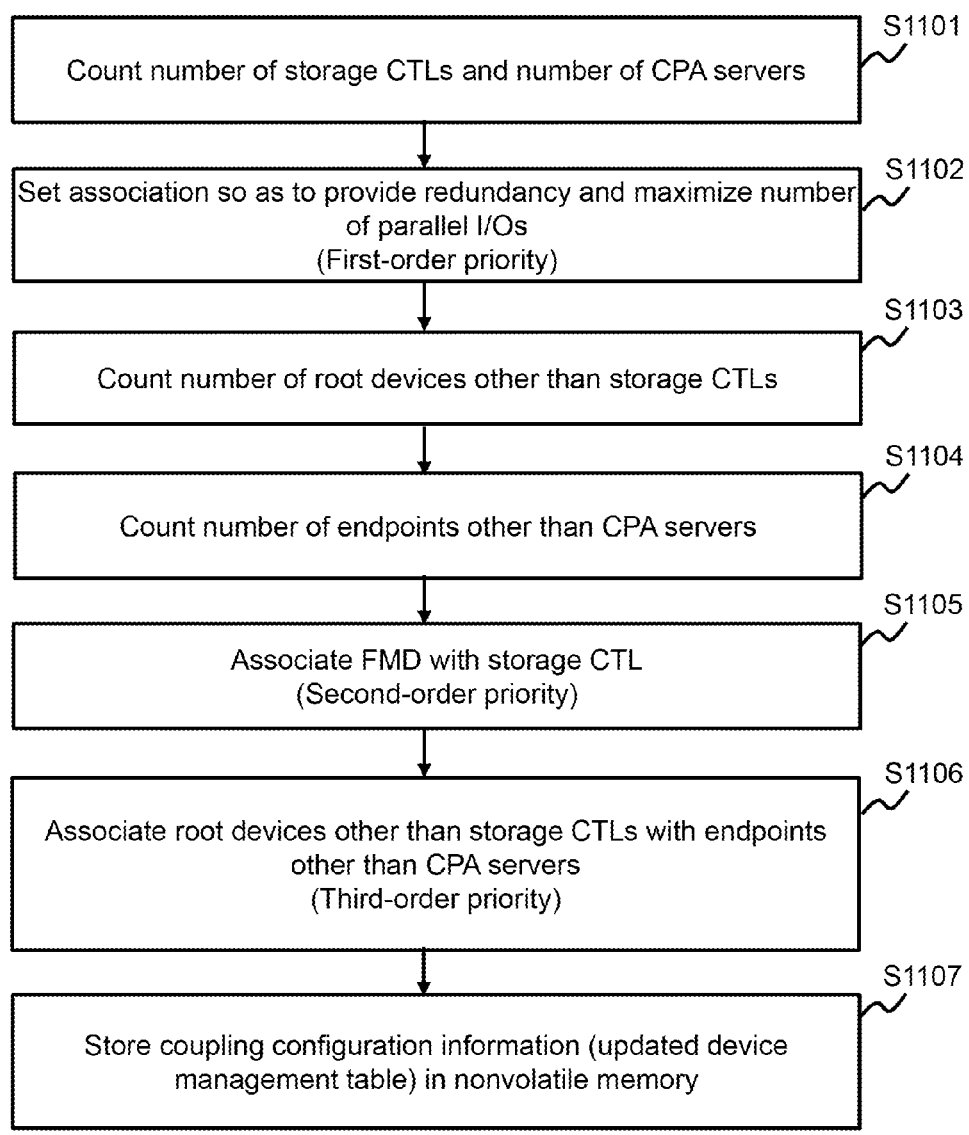
FIG. 11 shows a flow of a coupling configuration determination process (S903 in FIG. 9).

FIG. 11 shows a flow of the coupling configuration determination process (S903 in FIG. 9).

The processor 302 of the SVP 108 refers to the device management table 400 to count the numbers of the storage CTLs and the CPA servers (S1101). In accordance with the first-order priority of the policy, the processor 302 associates each of the redundant storage CTLs with the same CPA server on the basis of the counted numbers, so as to secure redundancy and associates N CPA servers (N is a natural number) with a single storage port so as to maximize the number of parallel I/Os (S1102). It should be noted that the device coupling data of the storage CTL may include information representing with which of storage CTLs the storage CTL forms the redundant storage CTLs, and on the basis of the information, information indicating which of the storage CTLs constitutes the redundant storage CTL may be registered in the device management table 400.

Then, the processor 302 refers to the device management table 400 to count the number of root devices other than the storage CTLs (pass-through servers) (S1103), and to count the number of endpoints other than the CPA servers (S1104).

The processor 302 associates the FMDs (the endpoints) with the storage CTLs in accordance with the second-order priority of the policy (S1105).

The processor 302 associates the root devices other than the storage CTLs (pass-through device) with the endpoints other than the CPA servers in accordance with the third-order priority of the policy (S1106).

The association set through this series of the processes corresponds to the determination of a coupling configuration. Specifically, in this series of the processes, to set associations between the devices is to set the bus numbers of the endpoints to the same number as the bus number of the root device to be associated with the endpoints. The processor 302 configures, to the PCI switch 103, the coupling information (e.g., association between the storage ports) in accordance with the coupling configuration. The processor 302 stores the updated device management table 400 representing the coupling configuration in the nonvolatile memory (S1107).

When a PCI device is newly coupled to the PCI switch 103, the processor 302 reflects the newly coupled PCI device to the coupling configuration represented by the device management table 400 stored in the nonvolatile memory. As a result, even when a PCI device is newly coupled to the PCI switch 103, it is possible to change the coupling configuration without changing the addresses of the PCI devices (e.g., the port numbers assigned to the switch ports to which the PCI devices are coupled) which are already coupled to the PCI switch 103. Thus, the PCI device newly coupled to the PCI switch 103 is capable of being communicably coupled to the PCI device, which are already coupled to the PCI switch 103, without restarting by turning on power supply again.

Hereinafter, as examples, cases of a fault in a PCI device and an addition of a PCI device are employed to describe each of the processes.

Figure 12:
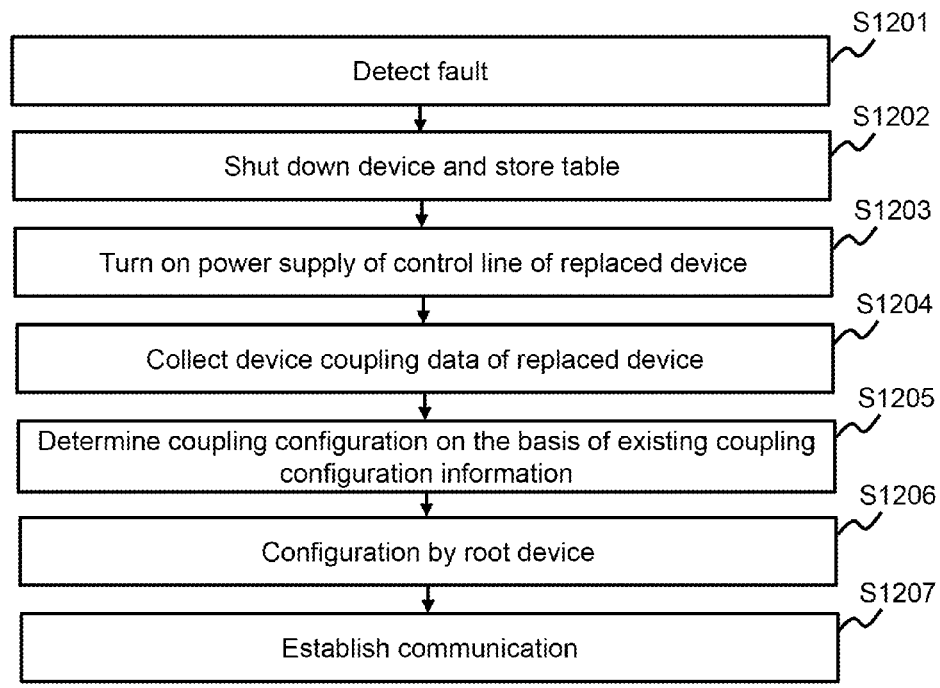
FIG. 12 shows a flow of a device fault process.

FIG. 12 shows a flow of a device fault process.

The processor 302 of the SVP 108 detects a fault in a PCI device (S1201), shuts down the PCI device in which the fault occurs, and stores the device management table 400 in the nonvolatile memory (S1202).

When the PCI device in which the fault occurs is replaced, the power supply of the control line of the replaced PCI device is turned on (S1203). The processor 302 of the SVP 108 collects the device coupling data of the replaced PCI device via the control line in which the power supply is turned on (S1204). The processor 302 determines a coupling configuration with respect to the replaced PCI device on the basis of the device management table 400 stored in the nonvolatile memory (S1205). Specifically, the processor 302 specifies the bus number corresponding to the switch port number included in the device coupling data of the replaced PCI device (the bus number corresponding to the PCI device in which the fault occurs) from the stored device management table 400, and configures the specified bus number, as the bus number of the replaced PCI device, to the device management table 400. The processor 302 may configure the specified bus number to the replaced PCI device.

The processor 302 sends an activation instruction to the root device having the same bus number as the bus number of the replaced PCI device, and the root device configures, to itself, the information representing that the replaced PCI device is under control of the root device (S1206). Then, the communication between the root device and the replaced PCI device is established (S1207).

Figure 13:
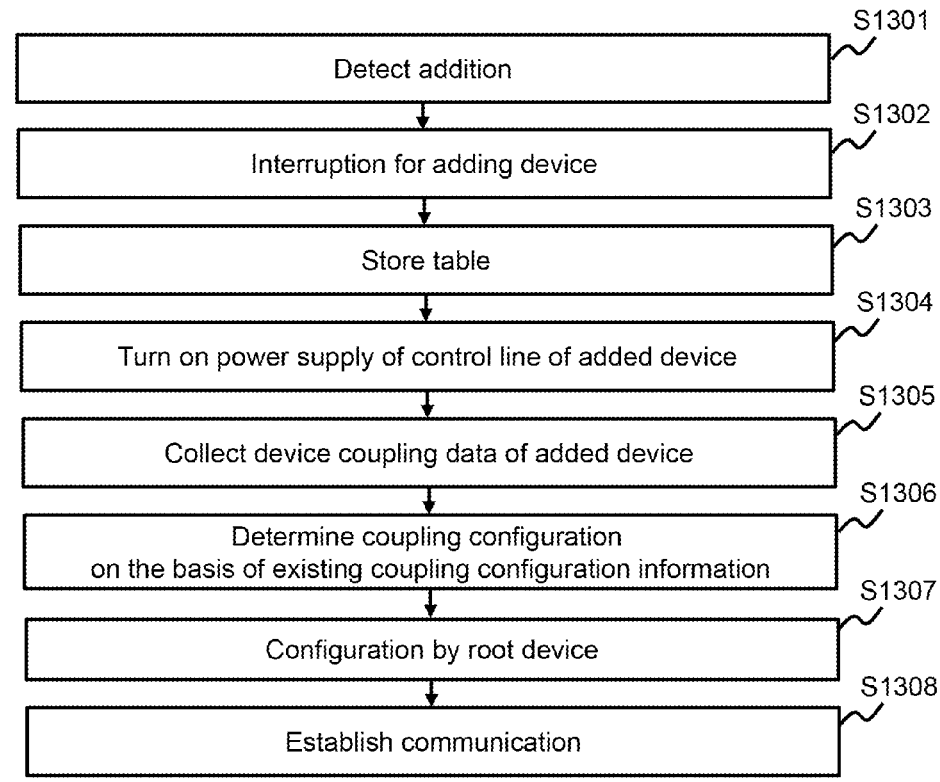
FIG. 13 shows a flow of a device addition process.

FIG. 13 shows a flow of a device addition process.

The processor 302 of the SVP 108 detects an addition of a PCI device (S1301), performs an interruption to add the PCI device (S1302), and stores the device management table 400 in the nonvolatile memory (S1303).

When a PCI device is added, the power supply of the control line of the added PCI device is turned on (S1304). The processor 302 of the SVP 108 collects the device coupling data of the added PCI device via the control line in which the power supply is turned on (S1304). The processor 302 determines a coupling configuration with respect to the added PCI device on the basis of the device management table 400 stored in the nonvolatile memory (51306). Specifically, the processor 302 specifies the bus number of the domain corresponding to the added PCI device from the stored device management table 400 on the basis of the switch configuration information and the switch port number included in the device coupling data of the added PCI device, and configures the specified bus number, as the bus number of the added PCI device, to the device management table 400. The specified bus number may be configured by the processor 302 to the added PCI device.

The processor 302 sends an activation instruction to the root device having the same bus number as the bus number of the added PCI device, and the root device configures, to itself, the information representing that the replaced PCI device is under control of the root device (S1307). Then, the communication between the root device and the added PCI device is established (S1308).

It should be noted that although the replaced or added PCI device is an endpoint in the description of FIG. 12 and FIG. 13, in a case where the replaced or added PCI device is a root device, substantially the same process are performed.

Although one embodiment is explained above, it is needless to say that the present invention is not limited to this embodiment, and numerous modification can be made without departing from the gist thereof.

REFERENCE SIGNS LIST

101: server blade, 102: storage CTL, 103: PCI switch, 108: SVP

The invention claimed is:

1. A computer system, comprising:
a switch including a plurality of switch ports;
a plurality of devices coupled to the plurality of switch ports, each device coupled to one or more switch ports with each switch port only having one device coupled thereto;
the plurality of devices including:
    a plurality of storage controllers configured as master devices, each coupled to a plurality of switch ports;
    a plurality of servers each coupled to a plurality of switch ports via respective server interfaces including at least two slave servers coupled as slave devices via a first type of server interface;
    a plurality of slave devices that are not servers; and
    at least one master device that is not a storage controller, including a server coupled to the switch via a second type of server interface as a master server; and
a management system coupled to the plurality of devices and the switch, wherein
the coupling between the plurality of devices and the switch being a coupling in accordance with a first communication interface, the first communication interface is a communication interface in which the master devices capable of being existing in the same space are defined,
the coupling between the plurality of devices and the switch, and the management system being a is coupling in accordance with a second communication interface different from the first communication interface, and
the management system is configured to
    collect device coupling data of each of the plurality of devices coupled to the switch, each of the device coupling data including an ID of a switch port to which a device is coupled and information representing an attribute indicating whether the device is a master or a slave,
    determine a coupling configuration for each master device on the basis of the plurality of the collected device coupling data and a protocol of the first communication interface, each coupling configuration being a configuration representing a master device, the number of which is equal to or less than a defined number, and one or more slave devices to be associated with the master device for each of one or more spaces such that:
        coupling configurations are first determined between storage controllers and slave servers such that there is a coupling configuration determined between a first storage controller and at least first and second slave servers, and there is another coupling configuration determined between a second storage controller and the first and second slave servers,
        coupling configurations are thereafter defined between storage controllers and other slave devices, and
        coupling configurations are thereafter defined between master devices that are not storage controllers and slave devices, and
    configure, to the switch, coupling information that is information in accordance with the determined coupling configurations.

2. The computer system according to claim 1, wherein each of the device coupling data includes information representing a type of device, and wherein the attribute in device coupling data of each of the on slave servers represents a slave.

3. The computer system according to claim 2,
wherein the switch includes a plurality of switch parts, each of which is configured to switch coupling,
wherein the plurality of storage controllers include a redundant storage controller,
wherein each of the redundant storage controllers is coupled to two or more switch parts of the plurality of switch parts, and
wherein at least one slave server is coupled to each of the redundant storage controllers.

4. The computer system according to claim 3,
wherein the coupling configurations includes a configuration which maximizes the number of slave servers parallelly accessible by each of the storage controllers.

5. The computer system according to claim 2,
wherein the plurality of devices include one or more third devices that are one or more devices of other types than the storage controllers and the servers,
wherein each of the one or more third devices is a slave device, and includes a nonvolatile memory device, and
wherein the coupling configurations includes an association of the nonvolatile memory device with at least one storage controller.

6. The computer system according to claim 5,
wherein the plurality of servers include a plurality of master servers,
wherein each of the master servers includes a processor module that is a master device, and a second type interface module coupled to the processor module and the switch,
wherein the second type interface module is a pass-through device which is neither a master device nor a slave device,
wherein the attribute in the device coupling data of each master server represents a master, and
wherein the coupling configurations includes an association of the third device other than the nonvolatile memory device with the master servers.

7. The computer system according to claim 2,
wherein the plurality of devices include one or more third devices that are one or more devices of other types than the storage controllers and the servers,
wherein the plurality of servers include a plurality of master servers,
wherein each of the master servers includes a processor module that is a master device, and a second type interface module coupled to the processor module and the switch,
wherein the second type interface module is a pass-through device which is neither a master device nor a slave device,
wherein the attribute in the device coupling data of each the master server represents a master, and
wherein the coupling configurations includes an association of at least one of the one or more third devices with the master servers.

8. The computer system according to claim 1,
wherein the plurality of switch ports include a first port and a second port,
wherein the first port is a switch port couplable not only to master devices but also to slave devices, and
wherein the second port is a switch port couplable not only to slave devices but also to master devices.

9. The computer system according to claim 8,
wherein the switch includes a switch part,
wherein the switch part includes an input part and a plurality of output parts, and is configured to output data, which is input to the input part, from any of the plurality of output parts in accordance with the coupling information configured by the management system,
wherein the switch device further includes a first sub-switch part and a second sub-switch part,
wherein the first sub-switch part and the second sub-switch part are configured to communicate bidirectionally,
wherein the first sub-switch part is interposed between the input part and the first port that is a switch port corresponding to the input part,
wherein the second sub-switch part is interposed between a predetermined output part of the plurality of output parts and the second port that is a switch port corresponding to the predetermined output part,
wherein the switch is configured to output data, which is input from the first port, from the second port via the first sub-switch part, the switch part, and the second sub-switch part, in accordance with the coupling information, when a master device is coupled to the first port and a slave device is coupled to the second port, and
wherein the switch is configured to output data, which is input from the second port, from the first port via the second sub-switch part, the first sub-switch part, and the switch part, and further via the second sub-switch part and the first sub-switch part, in accordance with the coupling information, when a slave device is coupled to the first port and a master device is coupled to the second port.

10. The computer system according to claim 1,
wherein the management system is configured to store coupling configuration information in a nonvolatile storage device, the coupling configuration information being information representing the determined coupling configurations, and
wherein the management system is configured to determine a coupling configuration reflecting the newly coupled device into the coupling configurations represented by the stored coupling configuration information, when a device is coupled to the switch.

11. The computer system according to claim 10,
wherein the coupling configuration information includes two or more information units corresponding to two or more of the switch ports, respectively,
wherein each of the information units includes a space ID of a space where a device exists, and a switch port ID of a switch port to which the device is coupled,
wherein the newly coupled device is a device with which any one of the plurality of devices is replaced, and
wherein the management system is configured to
collect the device coupling data of the replaced device,
specify the space ID corresponding to the switch port ID included in the device coupling data of the replaced device, from the coupling configuration information, and
configure the specified space ID to the replaced device.

12. The computer system according to claim 10,
wherein the coupling configuration information includes two or more information units corresponding to two or more of the switch ports, respectively,
wherein each of the information units includes a space ID of a space where a device exists, and a switch port ID of a switch port to which the device is coupled, wherein the newly coupled device is a newly added device,
wherein the management system is configured to
collect the device coupling data of the added device,
specify a space ID of a space corresponding to the added device, on the basis of the coupling configuration information and a switch port ID included in the device coupling data of the added device, and
configure the specified space ID to the added device.

13. The computer system according to claim 1,
wherein the first communication interface is PCIe (PCI-Express),
wherein a master device is a root device, and
wherein a slave device is an endpoint.

14. A management system of a computer system including a switch including a plurality of switch ports, and a plurality of devices coupled to the plurality of switch ports, each device coupled to one or more switch ports with each switch port only having one device coupled thereto, the plurality of devices including a plurality of storage controllers configured as master devices, each coupled to a plurality of switch ports, a plurality of servers each coupled to a plurality of switch ports via respective server interfaces including at least two slave servers coupled as slave devices via a first type of server interface, a plurality of slave devices that are not servers, and at least one master device that is not a storage controller, including a server coupled to the switch via a second type of server interface as a master server; the management system comprising;
an interface device coupled to the plurality of devices and the switch, and
a processor coupled to the interface device,
wherein the coupling between the plurality of devices and the switch is coupling in accordance with a first communication interface, the first communication interface is a communication interface running on a protocol in which one master device is capable of existing in the same space, and one or more slave devices are capable of being coupled to the one master device,
wherein the coupling between the at least one of the plurality of devices and the switch, and the interface device is coupling in accordance with a second communication interface different from the first communication interface, and
wherein the processor is configured to
collect device coupling data of each of the plurality of devices coupled to the switch, each of the device coupling data including an ID of a switch port to which a device is coupled and information representing an attribute indicating whether the device is a master or a slave,
determine coupling configurations on the basis of the plurality of the collected device coupling data and a protocol of the first communication interface, the coupling configuration being configurations representing a master device, the number of which is equal to or less than a defined number, and one or more slave devices to be associated with the master device for each of one or more spaces, such that:
coupling configurations are first determined between storage controllers and slave servers such that there is a coupling configuration determined between a first storage controller and at least first and second slave servers, and there is another coupling configuration determined between a second storage controller and the first and second slave servers,
coupling configurations are thereafter defined between storage controllers and other slave devices, and
coupling configurations are thereafter defined between master devices that are not storage controllers and slave devices, and
configure, to the switch, coupling information that is information in accordance with the determined coupling configurations.

15. A coupling configuration control method of a computer system including a switch including a plurality of switch ports, a plurality of devices coupled to the plurality of switch ports, each device coupled to one or more switch ports with each switch port only having one device coupled thereto, the plurality of devices including a plurality of storage controllers configured as master devices, each coupled to a plurality of switch ports, a plurality of servers each coupled to a plurality of switch ports via respective server interfaces including at least two slave servers coupled as slave devices via a first type of server interface, a plurality of slave devices that are not servers, and at least one master device that is not a storage controller, including a server coupled to the switch via a second type of server interface as a master server;
wherein the coupling between the plurality of devices and the switch is coupling in accordance with a first communication interface, the first communication interface is a communication interface running on a protocol in which one master device is capable of existing in the same space, and one or more slave devices are capable of being be coupled to the one master device,
wherein the coupling between the at least one of the plurality of devices and the switch, and the interface device is coupling in accordance with a second communication interface different from the first communication interface, and
the coupling configuration control method comprising:
collecting device coupling data of each of the plurality of devices coupled to the switch, where each of the device coupling data includes an ID of a switch port to which a device is coupled and information representing an attribute indicating whether the device is a master or a slave;
determining a-coupling configurations on the basis of the plurality of the collected device coupling data and a protocol of the first communication interface, where the coupling configurations are configurations representing a master device, the number of which is equal to or less than a defined number, and one or more slave devices to be associated with the master device for each of one or more spaces, such that:
coupling configurations are first determined between storage controllers and slave servers such that there is a coupling configuration determined between a first storage controller and at least first and second slave servers, and there is another coupling configuration determined between a second storage controller and the first and second slave servers,
coupling configurations are thereafter defined between storage controllers and other slave devices, and
coupling configurations are thereafter defined between master devices that are not storage controllers and slave devices, and configuring, to the switch, coupling information that is information in accordance with the determined coupling configurations.

* * * * *